US009235461B2

(12) United States Patent
Palframan et al.

(10) Patent No.: US 9,235,461 B2
(45) Date of Patent: Jan. 12, 2016

(54) METHOD AND APPARATUS FOR SOFT ERROR MITIGATION IN COMPUTERS

(71) Applicant: Wisconsin Alumni Research Foundation, Madison, WI (US)

(72) Inventors: David John Palframan, Madison, WI (US); Nam Sung Kim, Middleton, WI (US); Mikko Lipasti, Lake Mills, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 164 days.

(21) Appl. No.: 14/180,750

(22) Filed: Feb. 14, 2014

(65) Prior Publication Data
US 2015/0234693 A1      Aug. 20, 2015

(51) Int. Cl.
| G06F 11/00 | (2006.01) |
| G06F 11/07 | (2006.01) |
| G06T 1/20 | (2006.01) |

(52) U.S. Cl.
CPC ........ G06F 11/0751 (2013.01); G06F 11/0721 (2013.01); G06T 1/20 (2013.01)

(58) Field of Classification Search
CPC ............ G06F 11/0721; G06F 11/0751; G06F 11/1008; G06F 11/1012; G06F 11/1052; G06F 11/1068; G06F 11/1072; H01L 23/552; H03K 19/0033
See application file for complete search history.

(56) References Cited

U.S. PATENT DOCUMENTS

| 5,949,248 | A | * | 9/1999 | LaMacchia ........ | H03K 19/0033 326/21 |
| 7,653,850 | B2 | | 1/2010 | Tschanz et al. | |
| 2008/0297191 | A1 | * | 12/2008 | Plants ................. | G06F 11/1008 326/9 |
| 2014/0281802 | A1 | * | 9/2014 | Coe ..................... | G06F 11/1068 714/763 |
| 2015/0074631 | A1 | * | 3/2015 | Pandey ............... | G06F 17/5045 716/136 |
| 2015/0234967 | A1 | * | 8/2015 | Mazzawi ............ | G06F 17/5036 716/106 |

OTHER PUBLICATIONS

Wu et al., "Power-Aware Soft Error Hardening via Selective Voltage Scaling", Oct. 12-15, 2008, IEEE International Conference on Computer Design, pp. 301-306.*
Asadi et al., "Soft Error Hardening for Logic-level Designs", 2006, IEEE, pp. 4139-4142.*
Lin et al., "Soft-Error Hardening Designs of Nanoscale CMOS Latches", 2009, 27th IEEE VLSI Test Symposium, pp. 41-46.*
Gilanj et al.; Scratchpad Memory Optimizations for Digital Signal Processing Applications Conference; Design, Automation & Test in Europe Conference & Exhibition (DATE), IEEE; Mar. 2011; pp. 1-6; Europe.
Eibl et al.; Reduced Precision Checking for a Floating Point Adder; Defect and Fault Tolerance in VLSI Systems; IEEE Computer Society; Oct. 2009; pp. 145-152; US.

* cited by examiner

Primary Examiner — Michael Maskulinski
(74) Attorney, Agent, or Firm — Boyle Fredrickson, S.C.

(57) ABSTRACT

Hardening of an integrated circuit such as a GPU processor to soft errors caused by particle strikes is applied selectively to the set of devices according to the magnitude of error resulting from this soft error for the particular device. This approach differs from approaches that protect all devices, all devices likely to produce an output error, or all devices that are vulnerable.

20 Claims, 8 Drawing Sheets

METHOD AND APPARATUS FOR SOFT ERROR MITIGATION IN COMPUTERS

STATEMENT REGARDING FEDERALLY SPONSORED RESEARCH OR DEVELOPMENT

This invention was made with government support under 0953603, 1217102, 1116450 and 1318298 awarded by the National Science Foundation. The government has certain rights in the invention.

BACKGROUND OF THE INVENTION

The present invention relates to computer architectures and in particular to circuits for mitigation of soft errors in computer architectures such as graphic processing units.

The increasing complexity and decreasing scale of integrated circuits used for electronic computers make such electronic computers increasingly susceptible to "soft errors". Soft errors are generally those which do not reflect a fundamental failure in the circuit but rather an episodic error, for example, caused by a particle strike or random electrical noise which switches the state of a logical gate or memory cell. In this regard, soft errors can affect both the execution circuit of the computer (e.g. the ALU) by changing the state of logical gates and the memory circuit of the computer (e.g. the registers or other memory structures) by changing the state of a memory cell.

Known techniques for preventing soft errors include selecting packaging materials with low radioactivity and increasing the size of the circuit structures (so they are less susceptible to the small energy contributions of particle strikes). Known techniques for detecting and correcting soft errors include the addition of error detection and correction bits to memory and the use of redundant execution circuits (e.g. triple redundancy) to detect errors in the execution circuits and correct those errors through a majority vote or subsequent execution.

Graphic processor units (GPUs) are specialized electronic computers typically used for high-speed processing of graphical data. Such GPUs employ a large number of execution units and distributed memory registers. Historically soft errors have not been a significant concern in GPUs because occasional errors in graphic images are localized and easily ignored by the viewer.

GPUs are increasingly being applied to tasks previously assigned to general-purpose computing in which soft errors can significantly affect the validity of the results. The large number of execution units and registers of the GPU, however, can make it impractical to use conventional hardening techniques that increase the area of the devices or add redundant circuits for error detection.

It has been recognized that not all soft errors affecting a gate or memory cell will necessarily produce an error in the results of the computation. For example, errors in NOP instructions, logically masked bits, and dynamically dead code will not affect the computational output. Accordingly, efforts have been made to identify generally how susceptible a given architecture is to soft errors. Such information can generally guide the designer, for example, in where and how much hardening circuitry to employ.

SUMMARY OF THE INVENTION

The present inventors have recognized that previous efforts to identify the sources of soft errors have detrimentally adopted a "binary" approach to the problem, that is, examining only whether a device-level soft error creates output errors while ignoring the magnitude of the output errors created. In contrast to this approach, the present inventors have determined that many soft errors affecting the output of a calculation can be practically disregarded for many important computational tasks. In particular, the impact of a soft error in the least significant bits of the output word will often be disproportionately low with respect to the magnitude of error in the output. By quantitatively assessing the effect of device-level soft errors on the magnitude of error in the calculation results, more precise hardening of the architecture can be employed, substantially conserving resources and reducing the burden of hardening circuit.

In one embodiment, the present invention provides an electronic computer having multiple execution units comprised of gates that apply arithmetic/logical operations to input words to produce output words. The computer may also include word storage units having memory cells communicating with the multiple execution units for storing output words. Soft error hardening circuit is allocated to a subset of the gates or memory cells susceptible to soft errors according to a quantitative determination relating soft errors in the gates or memory cells to an average magnitude of error in the output words such as provides a ranking of gates or memory cells into a plurality of levels.

It is thus a feature of at least one embodiment of the invention to reduce the overhead of soft error hardening by disregarding some soft errors that affect the output words according to a predetermined acceptable magnitude of error. This differs substantially from systems that attempt to mitigate all errors that are manifest in the output of the device.

The soft error hardening circuitry may mitigate soft errors in the memory cells that affect bits of the output words in a first range of more significant bits and not mitigate soft errors that affect bits of the output words in a second range of less significant bits.

It is thus a feature of at least one embodiment of the invention to provide a simple method of selectively hardening memory cells according to the significance of the bits of output words.

In addition or alternatively, the soft error hardening circuitry may mitigate soft errors in the gates that affect bits of the output words above a predetermined threshold of average magnitude of output error in the output words over many different input words.

It is thus a feature of at least one embodiment of the invention to provide a comprehensive mechanism for evaluating the significance of soft errors among multiple gates in an arbitrarily complex circuit. By considering average magnitude of output error, gates with soft errors that cause high magnitude errors and gates with soft errors that cause frequent errors can both be successfully ranked.

Alternatively, the soft error hardening circuitry may mitigate soft errors in the gates that affect bits of the output words in a first range of more significant bits and not mitigate soft errors that affect bits of the output words in a second range of less significant bits.

It is thus a feature of at least one embodiment of the invention to provide a ranking system that emphasizes magnitude of error.

The soft error hardening circuitry may provide detection of errors in the output words only for a subset of most significant bits of the output words and repeat an arithmetic/logical operation on an input word in response to a detected output error in a corresponding output word.

It is thus a feature of at least one embodiment of the invention to permit "precision-aware" mitigation of output errors by detection and correction, rather than prevention.

The soft error hardening circuitry may detect soft errors in the gates using a duplication of only a portion of the execution units calculating only most significant bits of the output words and comparing an output of the duplication to the output words.

It is thus a feature of at least one embodiment of the invention to employ a detection circuit without the high cost of full redundancy or triple redundancy.

Alternatively, the soft error hardening circuitry may detect output errors by detecting soft error gate state changes for the subset of gates.

It is thus a feature of at least one embodiment of the invention to provide gate level error detection by detecting asylachronous particle strike state changes.

Generally, the soft error hardening circuitry may increase, in the subset of gates or memory devices, at least one of the size of transistor structures comprising gates or memory devices, the number of transistors implementing the gates or memory devices, and the number of redundant gates or memory devices, relative to gates and memory devices not in the subset.

It is thus a feature of at least one embodiment of the invention to provide a system that works well with a variety of different soft error prevention techniques while minimizing the cost and burden of those techniques.

The resources of the soft error hardening circuitry may be applied to gates or memory cells in proportion to a quantitative determination of the effect of soft errors on the gates or memory cells on the measure of the magnitude of the output error such as provides a ranking of gates or memory cells into a plurality of levels.

It is thus a feature of at least one embodiment of the invention to provide fine granularity in the precise placement of soft error hardening circuitry.

The electronic computer may include a bit-shifting circuit for locating the most significant bits of different types of output words (such as integer data, floating-point data, and different word lengths) in a common bit range for storage and processing, the common bit range associated with gates or memory cells to which soft error hardening circuitry is selectively applied.

It is thus a feature of at least one embodiment of the invention to better exploit precisely placed soft error circuits by concentrating important data in protected channels. When only certain bit positions are protected against soft errors, bit shifting allows the most significant bits to be aligned with the protected bit positions.

These particular objects and advantages may apply to only some embodiments falling within the claims and thus do not define the scope of the invention.

DETAILED DESCRIPTION OF THE PREFERRED EMBODIMENT

Figure 1:
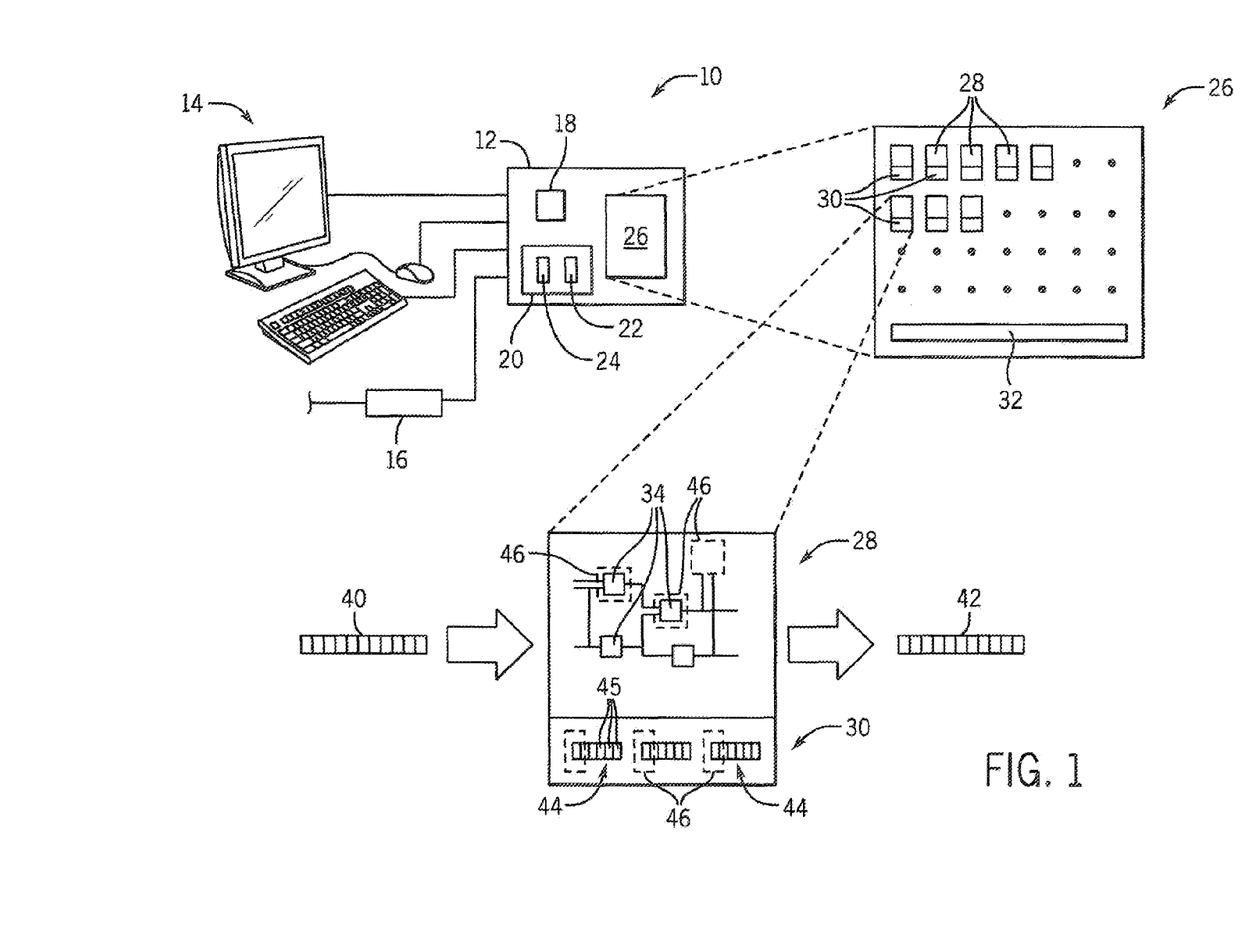
FIG. 1 is a simplified diagram of a computer system employing a graphic processing unit (GPU) streaming multiprocessor showing the execution units and register files of the GPU.

Referring now to FIG. 1, an example electronic computer 10 may provide for a processor unit 12 communicating with user interface devices 14 such as a graphic monitor, keyboard, or mouse as is generally understood in the art and/or with network interface 16 communicating with the Internet or the like.

The processor unit 12 may include one or more conventional processor cores 18 each generally providing a large instruction set intended for general purpose execution of a program or program threads. The processor core 18 may communicate with a memory 20, for example, holding a stored program 22 and data 24 for execution on the processor core 18.

In addition, the processor core 18 may communicate with a graphical processing unit GPU 26, the latter providing extremely rapid execution of tasks such as graphical processing that may admit to a high degree of parallel execution. The graphic processing unit 26 will generally include multiple execution units 28 each associated with a register file 30 for independent operation. Control circuit 32 coordinates the distribution of data and parallel execution of a computational task on the execution units 28.

Generally each multiple execution unit 28 will be constructed of multiple logical gates 34 (e.g. Boolean logic elements) operating together to receive one or more input words 40 of data and to execute limited and specialized instructions to produce an output word 42. Intermediate values and the results of this execution may be stored in the register file 30 in one or more register words 44 composed of memory cells 45.

In the present invention, selected portions of each of the execution units 28 and the register files 30 may be associated with soft error hardening circuitry 46 mitigating soft errors in individual gates 34 or memory cells 45. The soft error hardening circuitry 46, as will be discussed below, may either harden individual gates 34 or memory cells 45 against soft errors by reinforcing them against the effects of high-energy particle strikes or the like, or may harden the individual gates 34 or memory cells 45 by detecting and correcting errors. In either case, the hardening mitigates the effect of soft errors.

The present invention recognizes that there is a significant cost to implementing soft error hardening circuitry 46, in terms of using scarce integrated circuit resources (substrate area) and in increasing power consumption and possibly reducing operating speed. Accordingly, the present invention selectively and precisely locates the soft error hardening circuitry 46 to cover only devices (gates 34 or memory cells 45) where soft errors would produce significant error magnitudes. Thus, the present invention differs from systems that universally harden all devices or that harden devices without recognition of the contribution of the device to significant errors.

Figure 2:
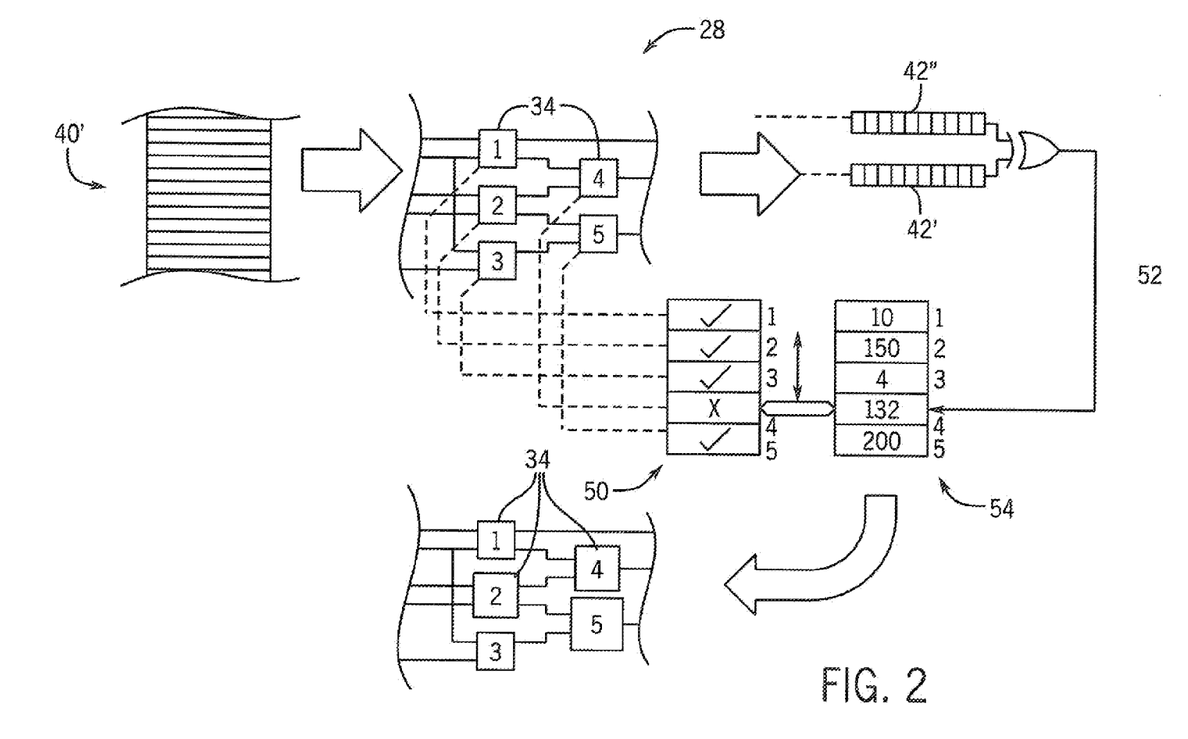
FIG. 2 is a process diagram of a method for determining a relative importance of gates of the execution units to output error magnitude.

Referring now to FIG. 2, in a first embodiment, the invention identifies those gates 34 that contribute most to error magnitude in output words 42 of the execution units 28. This may be done by generating a set of test input words 40, for example pseudo-randomly, and inputting them to a representative execution unit 28. Each test input word 40' is applied multiple times to the execution unit 28 and, at each application, individual gates 34 of the execution unit 28 are flipped, one at a time. This sequential "flipping" is represented by an "x" in a disable memory structure 50, for example, providing an output for each gate 34, but may be implemented in a variety of different ways. Flipping a gate 34 converts its correct output value to the opposite state, that is, from a correct value of 0 to 1 or from a correct value of 1 to 0. This process may be performed entirely in simulation at design time so that no hardware modifications of the execution units 28 are required for gate identification.

For each test input word 40' and each individually flipped gate 34, an output word 42' will be obtained and compared to an error-free output word 42", the latter being an output word 42 that is obtained for the given test input word 40' with none of the gates 34 disabled. A bitwise exclusive or of these output words 42' and 42" provides an error word 52 having a larger magnitude when higher order bits of the output word 42' are in error and a lower magnitude when only lower order bits of the output word 42' are in error. The magnitude of this error word 52 is added to a value in an error register 54 having one entry for each gate 34 so that the value for the gate 34 that has been flipped is incremented in proportion to the number of times that gate 34 has contributed to an error in the output word 42' and the magnitude of that error.

After completion of a loop through each of the test input words 40', and for each test input word 40' each disabling each of the gates 34, the error register 54 will have a set of values that indicate those gates 34 which create the largest magnitude error in the output word 42' on average when those gates 34 are flipped. These values will be termed average error magnitude values but need not be a mathematical average over the number of test input words 40' because each value is the result of the same number of input words 40 and thus may be directly compared.

Soft error hardening circuitry 46 is then applied only to a given number of gates 34 highest in the ranking of the values in the error register 54. In the general case, hardening will only be applied to the top N gates in a binary fashion (that is hardening or no hardening); however, the degree of hardening may also be controlled according to the value in the error register 54 associated with that gate. In FIG. 2, the hardening is indicated by an expanded size of the gate 34 such as relates to additional chip resources dedicated to preventing or correcting soft errors in those gates 34.

Referring again to FIG. 1, with respect to memory cells 45, soft error hardening circuitry 46 may be applied to important memory cells 45 readily identified by the relative position of the memory cells 45 in the register words 44, for example, with memory cells 45 storing more significant bits of output words 42 having more importance than those storing less significant bits of output words 42. Soft error hardening circuitry 46 may be selectively applied only to those memory cells 45 having been identified as having the greatest responsibility for large errors in output words 42 stored in the register files 30. Generally, hardening will be applied selectively to the most significant bits of the register words 44 as will be described below.

Referring now to FIGS. 3a-3d, a variety of known hardening techniques may be implemented by the soft error hardening circuitry 46 including increasing the structure size of the individual MOS transistors 60 making up the execution units 28 or register files 30. For example, an area 62 of a transistor gate in a MOS transistor 60 may be increased to a larger area 62'. Source and drain areas may likewise be increased. This technique may be applied to either or both of the transistors 60 of the gates 34 or memory cells 45.

Figure 3A:
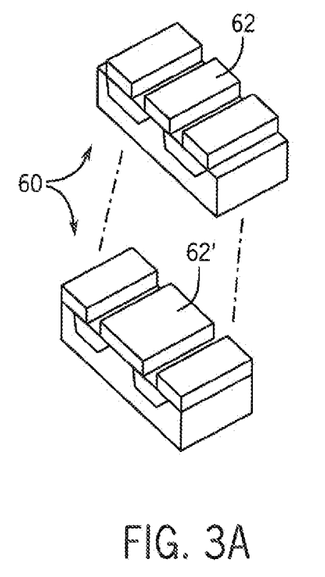
FIGS. 3a-3d are representations of four methods of hardening susceptible gates or memory cells by increasing device structure area, increasing device transistor number, providing redundant gates, and providing redundant functional blocks with checking circuits.
Figure 3B:
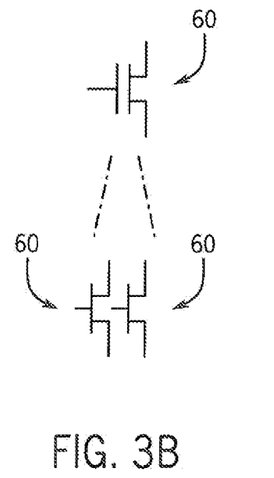

Alternatively or in addition, as shown in FIG. 3b, the number of transistors 60 making up the gate 34 or memory cell 45 may be increased. In the simplest implementation, redundant transistors may be incorporated into these devices effectively increasing the device area; however, more generally, different circuits may be employed to implement a given memory cell or gates 34 where the circuit differences are known to provide better immunity to soft errors. For example, a six-transistor memory cell may be used instead of a four-transistor memory cell 45. Again this hardening is applied selectively to some memory cells 45 or gates 34 as determined by the contribution those devices make to output error.

Figure 3C:
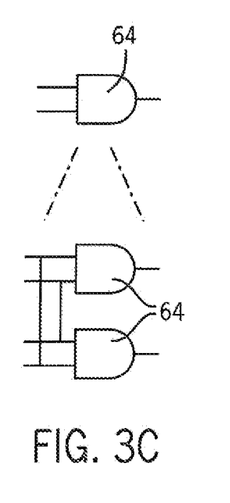

As shown in FIG. 3c, in addition or alternatively, the soft error hardening circuitry 46 may provide device-level redundancy by providing multiple devices 64 to implement a function previously provided by a single device 64. In the case of gates 34, multiple gates 34 may be used redundantly and their outputs connected or compared to detect errors. In the case of memory cells 45, additional memory cells may be used in the same redundant matter or introduced in the form of error correction bits (ECC bits) well known in the art. Typically, a detected error will be corrected by a repetition in the calculation as will be discussed below.

Figure 3D:
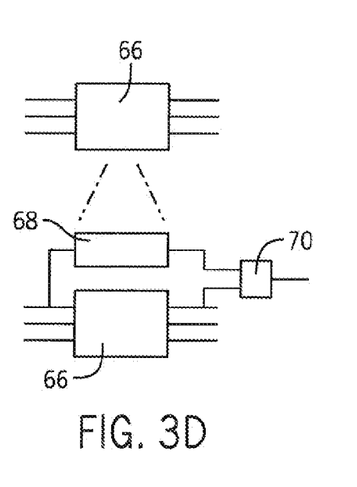

Referring to FIG. 3d, in addition or alternatively, the soft error hardening circuitry 46 may associate a given functional element 66, for example, an arithmetic logic unit, with an error checking circuit 68 and comparison circuit 70 to detect errors in the functional element 66. In the present invention, the error checking circuit 68 does not fully duplicate a functional element 66 but selectively checks only for significant errors in the output of the functional element 66, that is, errors that have significant magnitude.

Figure 4:
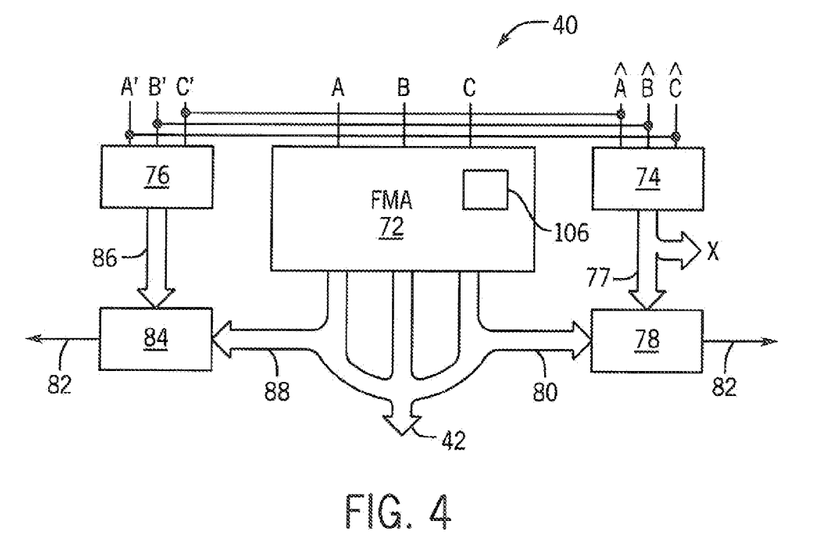
FIG. 4 is a detailed block diagram showing the provision of redundant functional blocks of reduced complexity and checking circuits per FIG. 3d.

Referring now to FIG. 4, an example of this latter technique applied to a fused multiply add (FMA) unit 72 may provide for a significand MSB checking circuit 74 and an exponent checking circuit 76. As is generally understood in the art, an FMA unit 72 receives three input words 40 here designated A, B, and C to provide the operation A+B*C. These input words 40 may be floating-point words, as depicted, in which each of the words A, B, and C will include a significand part ($\hat{A}$, $\hat{B}$, and Ĉ) and an exponent part (A', B', and C') or may be integer words having only an integer part received in the same manner as the significand parts.

In the case of floating-point input words 40, the FMA unit 72 may, for example, perform a calculation on a 23-bit significand and 8-bit exponent while the significand MSB checking circuit 74 may perform the calculation on only the most significant bits of the significand part, for example, the five most significant bits. This reduced precision of calculation reduces the power and chip area overhead of the significand MSB checking circuit 74 and focuses it on errors in the FMA unit 72 that result in high error magnitude in the output words 42.

Generally the output 77 of the significand MSB checking circuit 74 may not match the output of the FMA unit 72 even when there are no errors in the output of the FMA unit 72. This is because of the loss of carry-in bits of the least significant bits of the significand not subject to calculation by the significand MSB checking circuit 74. That is, the logic of the significand MSB checking circuit 74 implicitly assumes that the carry-in values from the lower bits are zero. To minimize false error indications, the significand MSB checking circuit 74 computes more significant bits than actually are compared (for example, computing five bits and comparing only three bits in the output 77). Thus, for example, of the five most significant bits of output 77 of the significand MSB checking circuit 74, the two least significant bits may be discarded and only the three MSB bits provided to a comparison circuit 78. The comparison circuit 78 also receives the corresponding three MSB bits 80 of the output word 42 from the FMA unit 72 and compares the two, indicating an error signal 82 if there is any discrepancy. This approach reduces false error indications based on the observation that carries are less likely to propagate across a large number of bits. As in a standard floating-point computation, the output of the significand MSB checking circuit 74 and FMA unit 72 are both normalized before comparison.

Also in the case of a floating point input word 40, the exponent checking circuit 76 receives the exponent values A', B' and C' and computes the new exponent value 86. This calculation is compared by comparator 84 with the new exponent value 86 with a small error margin to account for possible normalization from the FMA unit 72 to produce an error signal 82 in the event of mismatch.

Figure 5:
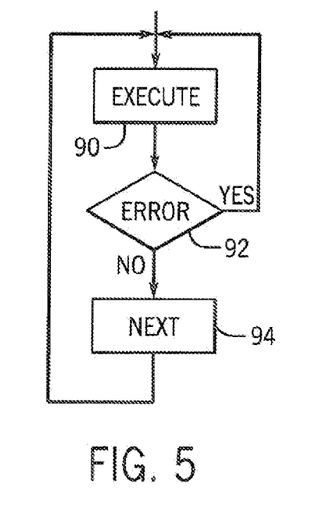
FIG. 5 is a flowchart showing the repetition of an instruction in the event of an error in a gate or memory cell.

Referring now to FIG. 5, after each execution by the FMA and significand MSB checking circuit 74 and exponent checking circuit 76, as indicated by process block 90, the error signals 82 are checked according to decision block 92 to see if there is an error. If there is no error, then at process block 94, next input words 40 are obtained and a new execution undertaken at process block 90. If there is an error, as determined at decision block 92, the current input word 40 is reprocessed at process block 90 with the expectation that the soft error will no longer be present.

Figure 6A:
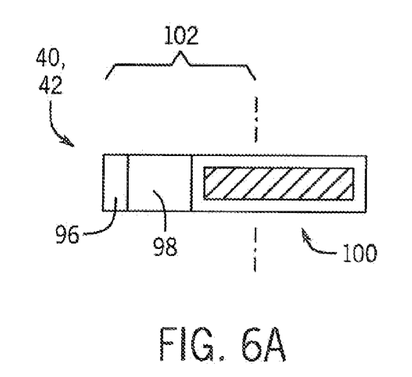
FIGS. 6a and 6b are figures showing standard left justification of floating point significand and standard right justification of integer data as expressed in an electronic computer and the conversion of integer data into an integer/floating-point expression using the present invention such as improves the efficacy of the precision-aware hardening of the present invention.
Figure 6B:
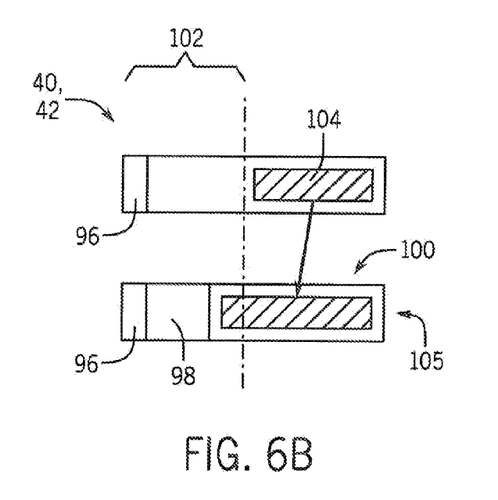

To the extent that the present invention may selectively harden particular bit positions of register words 44 or functional elements 66, the present inventors have recognized that it is important that the most significant bits of different data types fall within those hardened bit positions. This is particularly important in the difference between floating-point number and integer number expressions of data. Referring now to FIG. 6, a floating-point number will normally have a data structure in an input word 40 or output word 42 providing a leftmost sign bit 96 followed by multiple exponent bits 98 (for example, 8-bits in a 32-bit word) followed by multiple significand bits 100 (for example, 23-bits in a 32-bit word). The significand bits 100 are always left-justified so that if hardening is applied to a left-justified hardening region 102 of a data storage element in memory or data path in an execution unit, the hardening region 102 will include the most significant bits of the floating-point number. In contrast as shown in FIG. 6b, an integer number will typically have a data structure in an input word 40 or output word 42 having a most significant sign bit 96 followed by an integer part 104 (for example, 31-bits in a 32-bit word). Importantly, the integer part 104 will be right-justified and for this reason the most significant bits may not be in the hardening region 102 defined for the floating-point numbers or in fact in any consistent location within the output word 42.

Accordingly, the present invention may convert integer representations into floating-point representations when doing so would not truncate the integer part 104. Generally this conversion may be accomplished so long as the integer part 104 is less than 23 bits long in a 32-bit word (allowing eight bits for the exponent storage portion of the floating-point representation). The storage of the integer part 104 as a floating-point representation will be done in two's complement form to simplify bitwise operations on the integer values after conversion. Because the most significant bit of the integer part 104 can be zero or one (and this bit has significance as a sign bit in a twos complement form), the most significant bit is stored in the sign bit 96 to allow left justification.

This conversion may be performed only after the computation by the FMA unit 72 and when the data is stored in the register file 30. This allows the normalization shifter of the FMA unit 72 to be used in the conversion process. Alternatively, this conversion may be performed before the computation by the FMA unit 72 to fully exploit gates 34 that may be protected by the soft error hardening circuitry 46 before the normalization shifter.

When converted data is held in the register file 30 it is marked to indicate that it is integer data stored as floating-point data. This marking helps differentiate floating-point converted integer data from raw integer data which may also be stored in the register file 30 when the conversion process would truncate the integer part 104. When data is returned to memory 20, it is converted again to integer format.

Referring to FIGS. 4, 6a, 6b and 7, the conversion process may be implemented by a remapper 106 incorporated into the FMA unit 72 and using the pre-existing shifter circuit of the FMA unit 72. If the received input word 40 is an integer as indicated by decision block 108, then at decision block 110 a check is made to see if the integer part 104 can fit completely within the significand bits 100 of a floating-point representation (generally this is possible if the length of the significand bits 100 is less than 23-bits in a 32-bit word). If the integer part 104 is too big to fit within the significand bits 100, then it is processed by the FMA unit 72 as an integer as indicated by process block 112. In subsequent stores to register files 30 indicated by process block 114 and stores to memory 20 indicated by process block 116, the data is stored as an integer.

Figure 7:
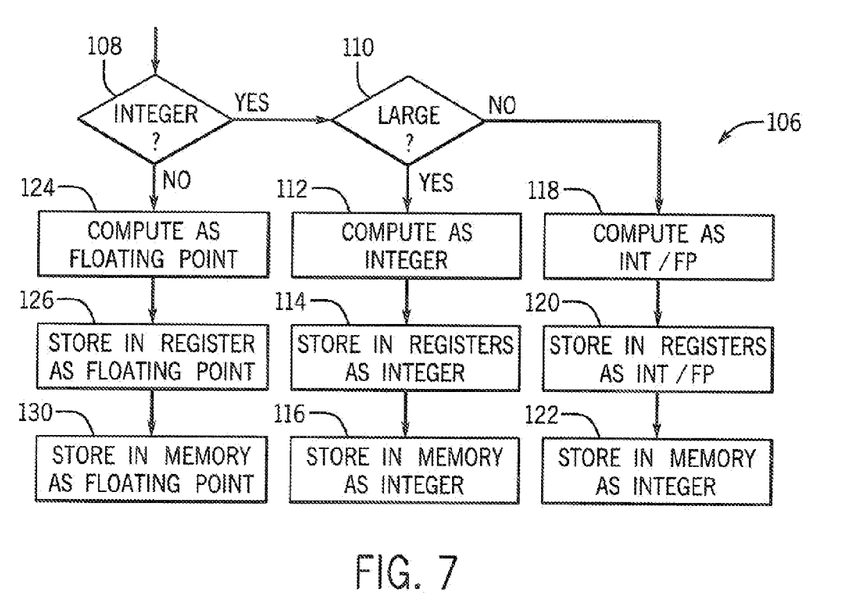
FIG. 7 is a simplified flowchart of the treatment of integer and floating-point data with respect to the conversion between the data expressions of FIGS. 6a and 6b.

If the integer part 104 is small enough to fit into the significand bits 100 then it is converted to a floating-point converted integer form 105 of FIG. 6b by the remapper 106 of the FMA unit 72 as indicated by process block 118. The floating-point converted integer form 105 essentially expresses the integer part 104 as a floating point number. As indicated by process block 121, the floating-point converted integer, when stored in the register file 30 is stored as a floating-point converted integer form in a register entry 132 and marked as such with a metadata bit 145 (for example, with a "one" value shown in FIG. 8a); however, before the converted data is stored in memory 20 per process block 122, it is converted again to integer form. The metadata bit 145 is necessary to identify the data as being in floating-point converted integer form because the instructions executed by the FMA unit 72 will be integer instructions and this implicit typing must be overridden.

If the input word 40 is in floating-point format, then at process block 124 it is executed by the FMA unit 72 as a floating-point value and at process block 126 stored in the register file 30 as a floating-point value. When this data is stored in the memory 20, as indicated by process block 130, it is again stored as a floating-point value.

In this way, integer values may take advantage of the precision-aware hardening of particular bits in execution units 28 and in the register files 30.

Figure 8A:
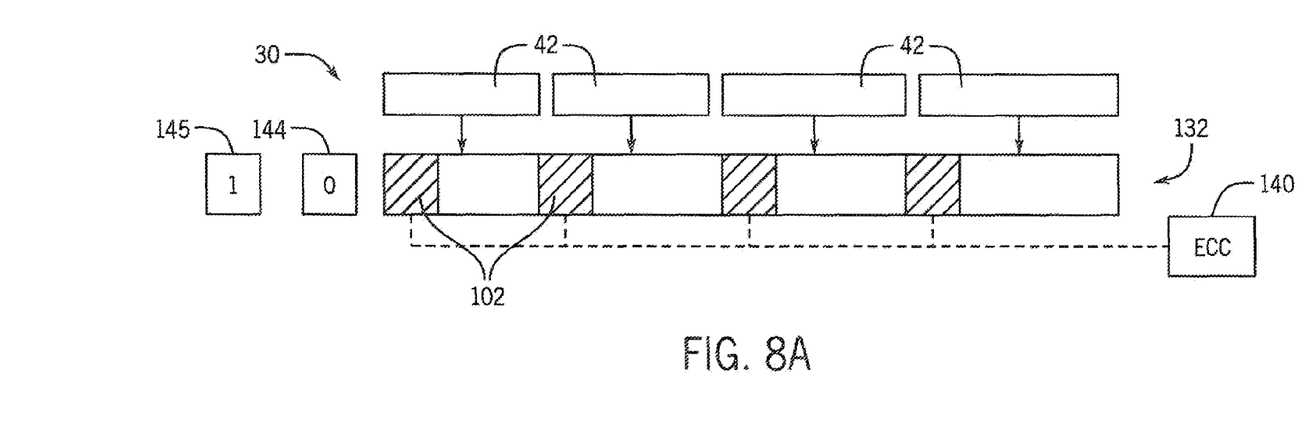
FIGS. 8a and 8b are diagrams showing the storage of output data for two different data word sizes per the present invention to better utilize the precision-aware hardening of the present invention.
Figure 8B:
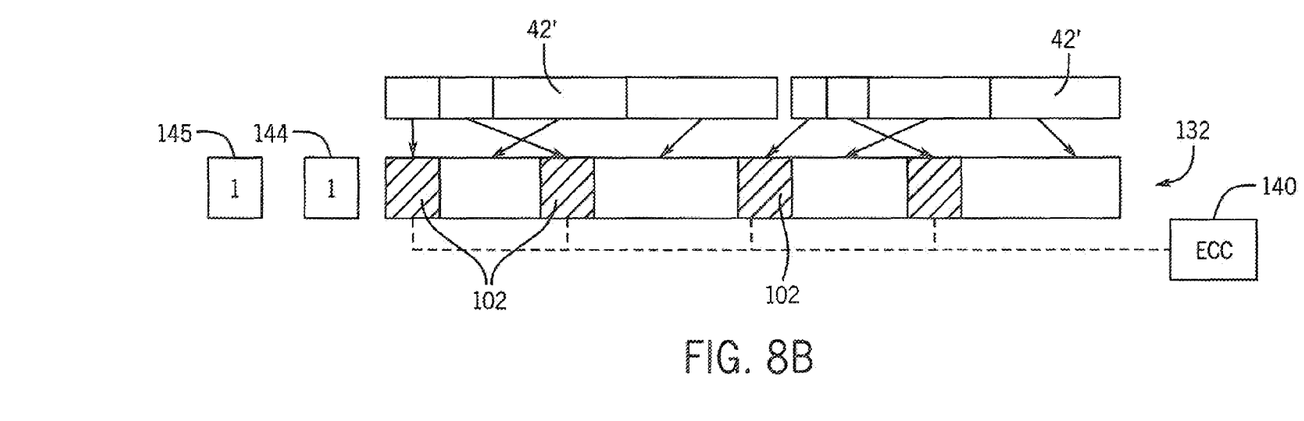

Referring now to FIG. 8*a*, a similar problem of data alignment occurs in the register files 30 where hardening region 102 (indicated by shading) may be selected as described above intended to align with the most significant bits of data words 42 stored in the register files 30. For the register files 30, bits associated with the hardening region 102 may have larger memory cell sizes, different memory architectures, or as shown, be associated with additional error correcting bits 140. During typical operation, 128-bit register entry 132 of register file 30 may receive four 32-bit output words 42 and the hardening region 102 may align with the most significant bits of each of the output words 42. For example, the hardening region 102 may cover the sign bit exponent bits and most significant bits of the significand of a floating-point number. Referring to FIG. 8*b*, in the event that the 128-bit register entry 132 is used to store two 64-bit output words 42', this alignment no longer aligns the most significant bits of the output words 42' with the hardening region 102. Accordingly, the output words 42' may be remapped as indicated by arrows 142 to divide their most significant bits up into successive hardening regions 102 of the register entry 132 and to divide their least significant bits into the unhardened regions. This remapping may be memorialized by an extra metadata bit 144 (for example, a one value) associated with the register entry 132 so that the reverse mapping can be performed when the data must be read.

Figure 9:
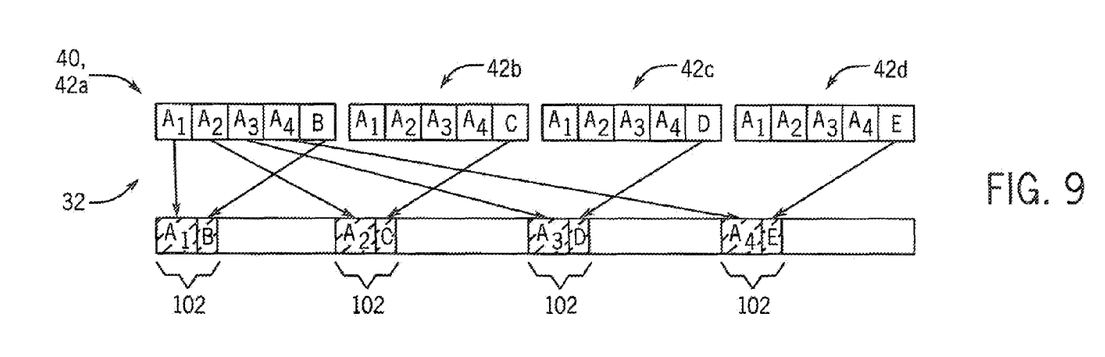
FIG. 9 is a diagram showing a system of compressing stored data words to better exploit the precision-aware hardening of the present invention.

Referring now to FIG. 9, this remapping concept may be aggressively exploited by a compression system that takes advantage of the fact that multiple output words 42*a*-42*d* (or input words 40) may share common most significant bits (for example, in the case where the words represent successive memory addresses). This remapping and compression may be performed by the control circuit 32 overseeing the movement of data from memory 20 to register files 30.

In particular, the most significant bits of four successive words 42*a*-42*d* (represented by portions A1, A2, A3, and A4) may be identical in each of the successive words 42*a*-42*d* while the least significant bits (represented by portions B, C, D, and E) may be unique to each of the words 42*a*-42*d* and may be different as identified by a compressor in the control circuit 32. In this case, one version of the shared most significant bits may be spread among a first part of each of the hardening regions 102 of the register entry 132 and the least significant bits which are not shared by the words 42*a*-42*d* fill the remainder of the hardening regions 102. In this way, limited bit protection may be leveraged to provide full protection of multiple words 42*a*-42*d*. This is just one illustrative example and the only requirement is that the number of hardened cells be greater than or equal to the total number of bits in A, B, C, D, and E combined, and the bits of A-E can be distributed across the hardened cells in any way Referring now to FIG. 10, the hardening associated with particular gates 34 may detect and correct errors at the gate level rather than in the output word 42 of a functional element 66. The particular gates 34 subject to this hardening would be selected according to the technique described with respect to FIG. 2 above. In one example, gate-level error detection detects erroneous values captured in flip flops or latches by inspection of the latch inputs or outputs whose timing indicates a particle strike rather than a legitimate data transition. In this approach, a system clock signal 150 may have a rising edge 152 at which a data signal 154 is sampled. A stable zone 156 is defined around the rising edge 152 of the clock signal 150 in which it is expected that legitimate data signals 154 will be stable at a single value (either the zero or one state). A transition 157 in a data signal 158 occurring during the stable zone 156 and caused by a particle strike event 159 may thus be identified and this identification used to repeat execution of the output word as described with respect to FIG. 5.

Figure 10:
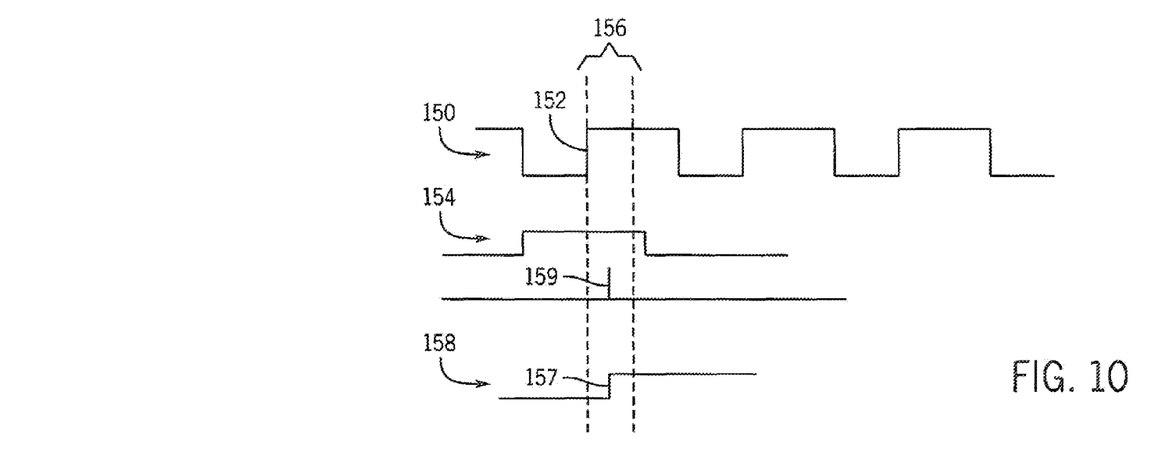
FIG. 10 is a timing diagram showing an alternative error-checking circuit that may be at the gate level.

Circuitry for identifying a state change that occurs after the rising edge 152 is described, for example, in U.S. Pat. No. 7,653,850 issued Jan. 26, 2010 and hereby incorporated in its entirety by reference. In this patent, the circuit is used to detect delay faults rather than soft errors caused by particle strikes, and in contrast to the present invention, is not selectively applied to gates that have been identified according to their contribution to high magnitude output errors. Nevertheless, the circuit can be utilized for the present invention.

Figure 11:
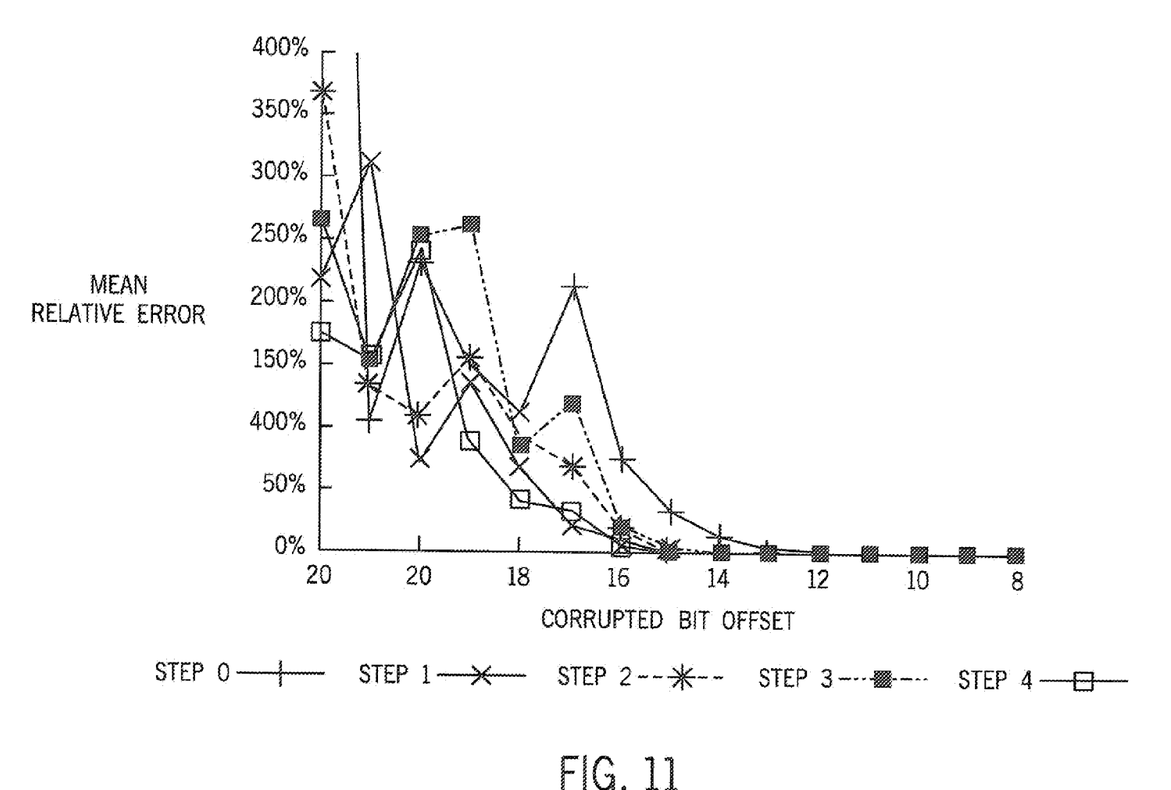
FIG. 11 is a chart showing mean error when computing the Black-Scholes algorithm depending on the significance of the erroneous bit showing how protecting a relatively small percentage of bits of a floating-point number can substantially reduce the magnitude of the error.

Referring now to FIG. 11, an example simulation of the Black-Scholes algorithm, different steps of the algorithm have been corrupted and the corruptions introduced at different bits in the output value to determine the mean relative errors as depicted. As can be seen, corruption of a minority of the highest order bits is responsible for substantially all of the mean relative error and, accordingly, hardening of, for example, the 12 least significant bits provides relatively little value. This concentration of error significance in a relative minority of bits underscores the value of the precision-aware hardening of the present invention.

The term soft errors as used herein refers to errors that are episodic and unlikely to recur with re-execution of an instruction or subsequent storing and reading of data at the same address. The term hardening refers both to techniques that prevent soft errors from occurring and that detect soft errors and correct them, in both cases mitigating the effect of the soft error. The term arithmetic/logical is intended to cover either logical operations such as Boolean primitives and bit level manipulations including shift left and shift right as well as arithmetic operations including addition and subtraction, multiplication and division comparisons and other standard computer instructions.

The invention is applicable not only to graphics processing units but any single core or multicore processor. Generally a multicore processor as used herein includes processors where different processing cores share common clock timing and thus must be operated at the same clock frequency or with synchronized clock frequencies having different multiples. The invention is more generally applicable to any integrated circuit where soft errors may present a limiting design challenge.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. An electronic computer comprising:
   multiple execution units applying arithmetic/logical operations to input words to produce output words, each word providing multiple bits, the execution units comprised of gates susceptible to soft errors;
   a word storage unit communicating with the multiple execution units for storing output words, the word storage unit comprised of memory cells susceptible to soft errors; and
   soft error hardening circuitry allocated to only a subset of the gates or memory cells susceptible to soft error according to a quantitative relationship between soft errors in the gates or memory cells and a measure of magnitude of output error in the output words such as provides a ranking of gates or memory cells into a plurality of levels.

2. The electronic computer of claim 1 wherein the soft error hardening circuitry mitigates soft errors in the memory cells that affect bits of the output words in a first range of more significant bits and does not mitigate soft errors that affect bits of the output words in a second range of less significant bits.

3. The electronic computer of claim 1 wherein the soft error hardening circuitry mitigates soft errors in the gates that affect bits of the output words above a predetermined threshold of average magnitude of output error in the output words over many different input words.

4. The electronic computer of claim 1 wherein the soft error hardening circuitry mitigates soft errors in the gates that affect bits of the output words in a first range of more significant bits and does not mitigate soft errors that affect bits of the output words in a second range of less significant bits.

5. The electronic computer of claim 1 wherein the soft error hardening circuitry provides output error detection of errors in the output words only for a subset of most significant bits of the output words and repeats an arithmetic/logical operation on an input word in response to a detected output error in a corresponding output word.

6. The electronic computer of claim 5 wherein the soft error hardening circuitry detects soft errors in the gates using a duplication of only a portion of the execution units calculating only most significant bits of the output words and comparing an output of the duplication to the output words.

7. The electronic computer of claim 5 wherein the soft error hardening circuitry detects output errors by detecting soft error gate state changes for the subset of gates.

8. The electronic computer of claim 1 wherein the soft error hardening circuitry increases, in the subset of gates or memory devices, at least one of a size of transistor structures comprising gates or memory devices, a number of transistors implementing the gates or memory devices, and a number of redundant gates or memory devices, relative to gates and memory devices not in the subset.

9. The electronic computer of claim 1 wherein resources of the soft error hardening circuitry are applied to gates or memory cells in proportion to a quantitative determination of an effect of soft errors on the gates or memory cells on the measure of the magnitude of the output error such as provides a ranking of gates or memory cells into a plurality of levels.

10. The electronic computer of claim 1 further including a bit shifting circuit for locating the most significant bits of different types of output words selected from integer data, floating-point data, and different word lengths, in a common bit range for storage and processing, the common bit range associated with gates or memory cells to which the soft error hardening circuitry is selectively applied.

11. The electronic computer of claim 10 wherein the execution units include a fused multiply add unit and wherein the fused multiply add unit incorporates the bit shifting circuit to convert right-justified integer data into left-justified floating-point data for execution and storage.

12. The electronic computer of claim 1 further including a memory management circuit that detects redundancy in stored output words in the word storage unit to compress the stored output words selectively into memory cells subject to soft error hardening circuitry.

13. The electronic computer of claim 1 wherein the electronic computer employs a graphical processing unit architecture.

14. A method of mitigating soft errors in an electronic computer of a type having:
   multiple execution units applying arithmetic/logical operations to input words to produce output words, each word providing multiple bits, the multiple execution units comprised of gates susceptible to soft errors;
   a word storage unit communicating with the multiple execution units for storing output words, the word storage unit comprised of memory cells susceptible to soft errors; and
   soft error hardening circuitry allocated to only a subset of the gates or memory cells susceptible to soft error according to a quantitative relationship between soft errors in the gates or memory cells to a measure of magnitude of output error in the output words such as provides a ranking of gates or memory cells into a plurality of levels;
   the method comprising the steps of:
   (a) applying a series of input words to the multiple execution units;
   (b) for each input word, forcing an error on a gate;
   (c) for each input word and each forced error, evaluating any error in a produced output word;
   (d) ranking each given gate according to a measure of magnitude of output error resulting from the forced errors to provide a plurality of ranking levels; and
   (e) applying the soft error hardening circuitry selectively according to the ranking of the gates.

15. The method of claim 14 further including the step of selectively applying the soft error hardening circuitry to memory cells storing bits of the output words in a first range of more significant bits and not to memory cells storing bits of the output words in a second range of less significant bits.

16. The method of claim 15 wherein the soft error hardening circuitry hardens at least one of gates and memory cells against errors by increasing an area of circuit of the gate or memory cell.

17. The method of claim 15 wherein the ranking is according to average error magnitude in the output words over all of the input words.

18. The method of claim 15 wherein the soft error hardening circuitry increases at least one of a size of transistor structures comprising gates, a number of transistors implementing the gates, and a number of redundant gates.

19. The method of claim 15 wherein the soft error hardening circuitry detects soft error gate state changes for the gates.

20. The method of claim 15 wherein the electronic computer employs a graphical processing unit architecture.

* * * * *